Dec. 27, 1966 B. N. KOVACEVIC 3,294,285
APPARATUS FOR DISPENSING LIGHTED CIGARETTES
Filed Jan. 4, 1965 5 Sheets-Sheet 1
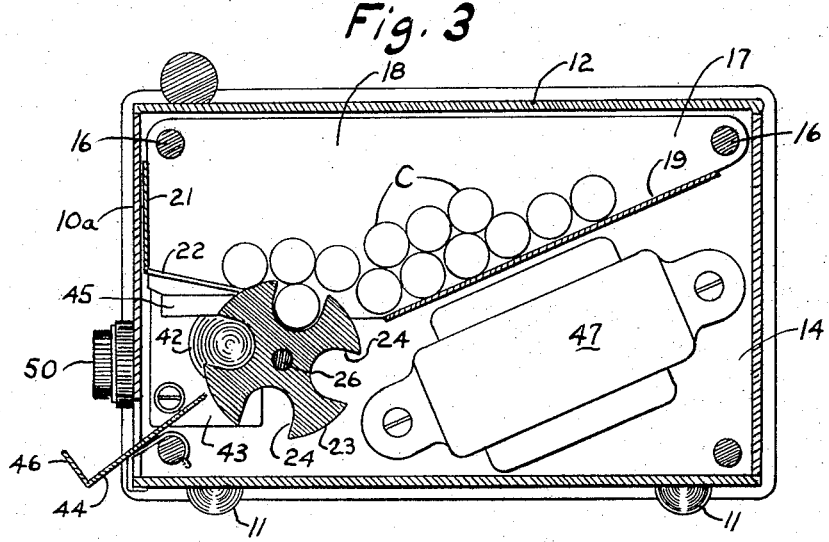
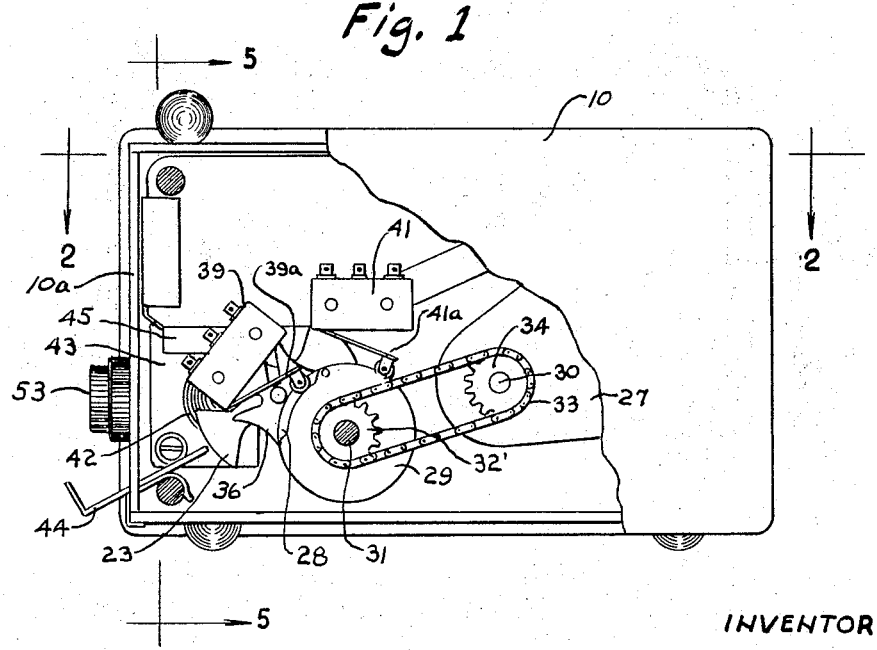
INVENTOR
BORIS N. KOVACEVIC
BY May R. Kraus Dec. 27, 1966    B. N. KOVACEVIC    3,294,285
APPARATUS FOR DISPENSING LIGHTED CIGARETTES
Filed Jan. 4, 1965    5 Sheets-Sheet 2
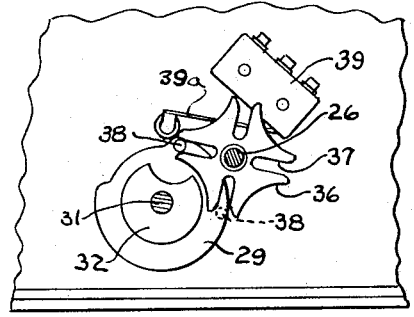
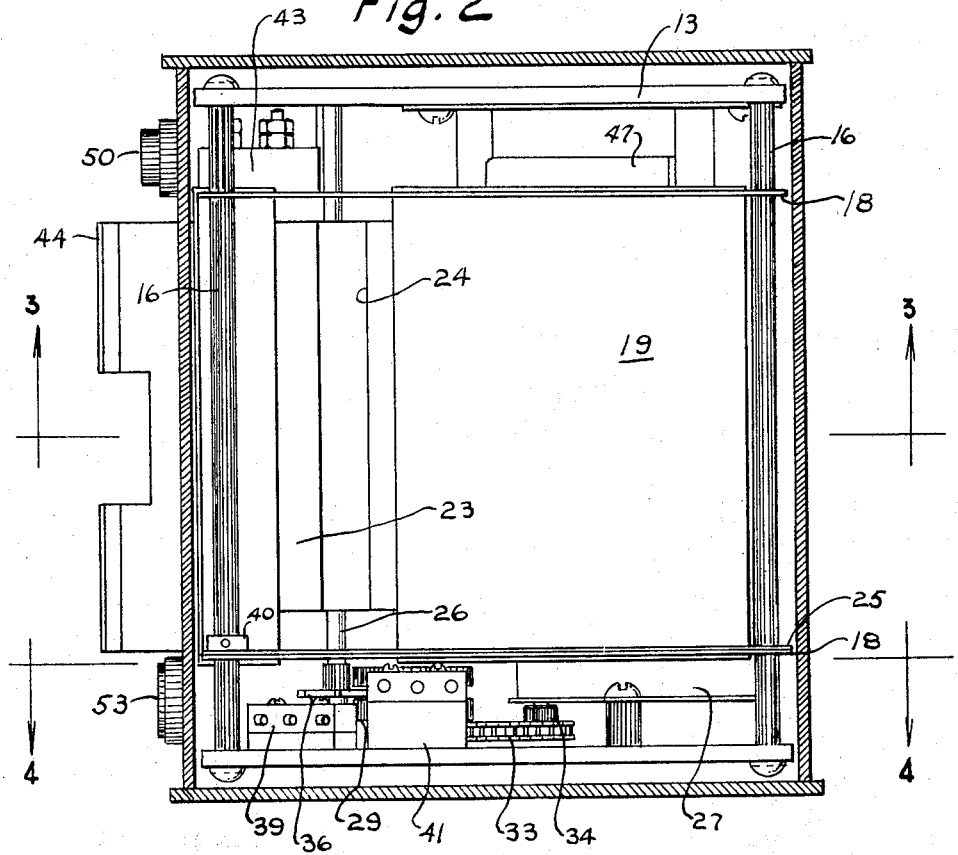
INVENTOR
BORIS N. KOVACEVIC
BY Dec. 27, 1966       B. N. KOVACEVIC       3,294,285
APPARATUS FOR DISPENSING LIGHTED CIGARETTES
Filed Jan. 4, 1965                    5 Sheets-Sheet 3
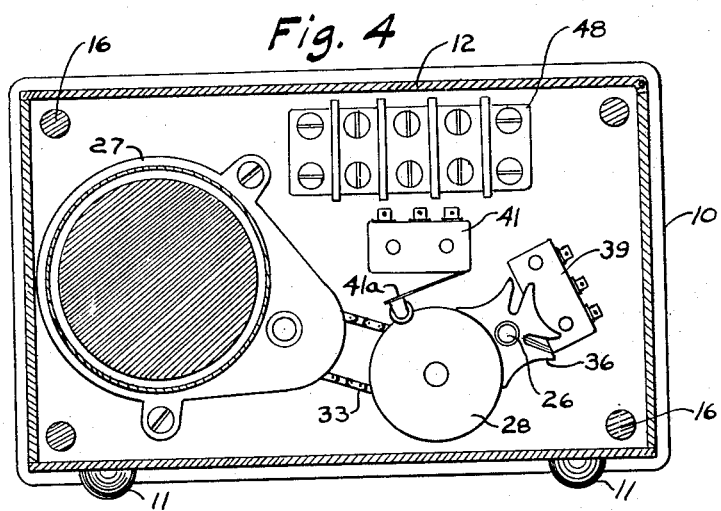
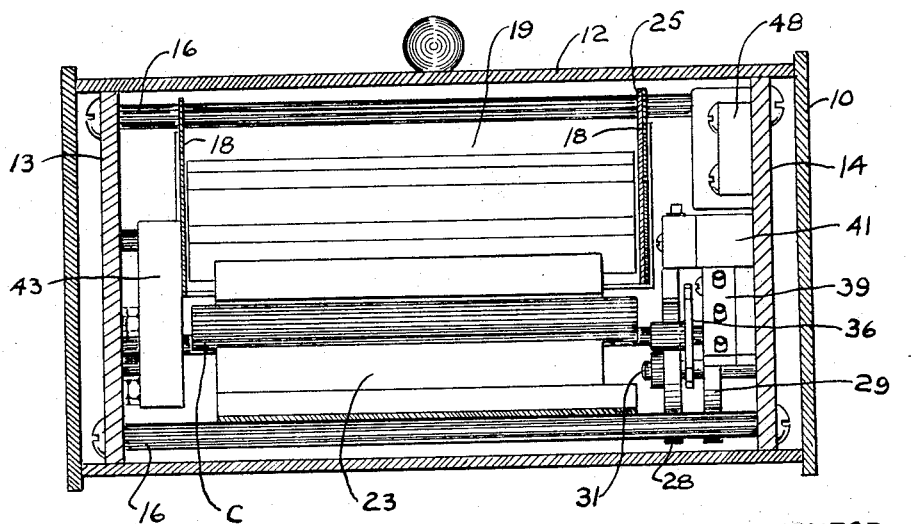
INVENTOR
BORIS N. KOVACEVIC
BY Mort R. Kraus Dec. 27, 1966   B. N. KOVACEVIC   3,294,285
APPARATUS FOR DISPENSING LIGHTED CIGARETTES
Filed Jan. 4, 1965   5 Sheets-Sheet 4

INVENTOR
BORIS N. KOVACEVIC
BY Max R. Kraus
ATTORNEY

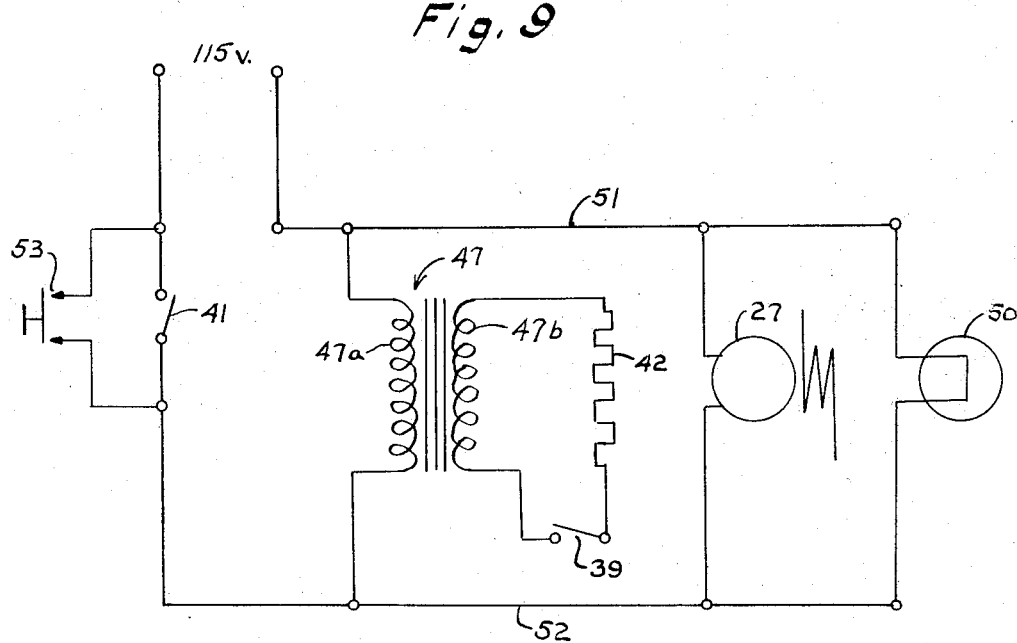

United States Patent Office 3,294,285
Patented Dec. 27, 1966

---

3,294,285
APPARATUS FOR DISPENSING LIGHTED CIGARETTES
Boris N. Kovacevic, 4419 N. Christiana Ave., Chicago, Ill. 60625
Filed Jan. 4, 1965, Ser. No. 423,190
7 Claims. (Cl. 221—147)

This invention relates to an apparatus for dispensing lighted cigarettes.

One of the objects of this invention is the provision of an apparatus for storing a quantity of cigarettes and for automatically dispensing lighted cigarettes, as desired.

Another object of this invention is the provision of an apparatus embodying a magazine for storing a quantity of cigarettes and having means operable upon the manual actuation of a control switch to effect a sequence of operations whereby a single cigarette which was previously moved automatically into registration with a heating element is ignited and then is discharged from the apparatus as a succeeding cigarette is moved into position to be ignited.

A further object of this invention is the provision of an apparatus which is simple in construction, efficient in operation and economical to manufacture.

Other and further objects and advantages of this invention will become apparent from the following description when the same is considered in connection with the accompanying drawings, in which:

FIG. 1 is an end elevational view of an apparatus in accordance with my invention and with a part broken away to show details of construction.

FIG. 2 is a cross-sectional view taken substantially on line 2—2 of FIG. 1.

FIG. 3 is a cross-sectional view taken substantially on line 3—3 of FIG. 2.

FIG. 4 is a cross-sectional view taken substantially on line 4—4 of FIG. 2.

FIG. 5 is a cross-sectional view taken substantially on line 5—5 of FIG. 1.

FIG. 6 is a fragmentary side elevational view of a combination of structural details.

FIG. 9 is an electrical circuit diagram of the apparatus.

Figure 8:
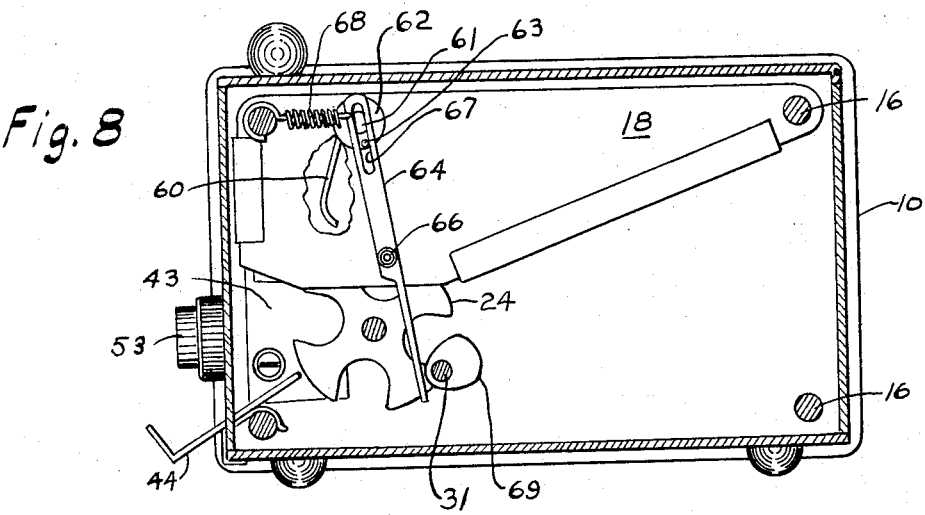
FIG. 8 is a cross-sectional view taken substantially on line 8—8 of FIG. 7.

Referring to the drawings, the numeral 10 indicates a housing supported on foot members 11 and provided with a slidable or hinged top closure member 12. Contained within the housing 12 is the apparatus of my invention, which includes a pair of end wall members 13 and 14 secured together in spaced relation by a plurality of brace rods 16 disposed one at each of the corners of the wall members. Supported by the upper brace rods 16 is a magazine 17 adapted to contain cigarettes and formed of a pair of vertical end walls 18, a downwardly inclined bottom member 19 and a forward wall 21 which terminates in a bottom portion 22 also downwardly inclined but in an opposite direction from the bottom 19. Referring to FIG. 3, it will be seen that the bottom members 19 and 22 afford a space therebetween to accommodate a portion of a rotatable member 23, generally cylindrical and provided with four longitudinally extending flutes 24, each adapted to receive a single cigarette. The member 23 is fixed on a shaft 26 which is journalled in end walls 13 and 14.

A wall member 25 is shaped substantially like the walls 18 and is provided with apertures to receive the brace bars 16 and is slidable axially of said bars. Said wall member affords means for accurately locating the cigarettes C in the flutes 24 so that the ends to be ignited are in proper spaced relation to the ignition element, hereinafter to be described, since the apparatus must be adapted for use both with regular and king size cigarettes. After an adjustment has been made, the wall member 25 is locked in a position of adjustment by means of a set screw cooperating with a collar 40 which is fixed to said wall member.

Supported on the end wall 14 is a synchronous motor 27 provided with a gear train arranged to reduce the speed of rotation of the driving shaft 30 to approximately 4 r.p.m. A pair of cams 28 and 29 are supported for rotation on the stub shaft 31 anchored in the end wall 14. The cams 28 and 29 are spaced axially from each other on shaft 31 and intermediate said cams is a cam lock 32, for a Geneva movement, presently to be described, the cams and cam lock being pinned together to rotate simultaneously as a unit. A sprocket wheel 32' is fixed to shaft 31 and is driven by a sprocket chain 33, which is in turn driven by a sprocket wheel 34 fixed on driving shaft 30.

A Geneva movement includes a member 36, shaped substantially as illustrated in FIG. 6, and fixed on shaft 26, said member being disposed in planar registration with the cam lock 32, intermediate the cams 28 and 29. The member 36 is provided with four equally spaced radial slots 37, each of which cooperates with a pin 38 carried by the cams 28 and 29 and bridging the space therebetween. The pin 38 engages sequentially with each of the slots 37 so that for each revolution of pin 38 about the axis of shaft 31, shaft 26 is caused to rotate one-quarter of a turn. As will be seen clearly in FIG. 6, when the pin 38 is in the dotted line position and in its revolution, in a counterclockwise direction, it is caused to engage in a corresponding slot 37 and effect rotation of member 36 substantially 90° and corresponding member 23. The position at which the pin 38 disengages from a slot 37 is shown by the solid lines. For the remainder of the revolution of the cams 28 and 29 the cam lock 32 is effective to prevent rotation of the member 36 and correspondingly member 23.

A microswitch 39 is supported on wall 14 and has a follower arm 39a which cooperates with cam 29. A second microswitch 41 is also supported on wall 14 and its follower arm 41a cooperates with cam 28.

Referring to FIG. 3, an ignition element 42 in the form of a spirally wound electrical resistance coil is housed within the well of an asbestos block 43 mounted on wall 14. As seen clearly in FIG. 3, the ignition element is so disposed that it is in substantial alinement with each of the flutes 24 as they are caused to move successively into registration therewith. A guard 45 of suitable insulating material, such as asbestos, is disposed above the ignition element 42 to protect other parts of the apparatus or contents thereof from the effects of the heat generated by the ignition element and to prevent inadvertent ignition of other cigarettes. A chute 44 provided with an upturned flange 46 and positioned substantially as illustrated extends through an opening in the forward wall 10a of the housing and affords means for receiving an ignited cigarette C so that it may be removed therefrom by the user.

A filament transformer 47 is suitably mounted between the walls 13 and 14 below the chute member 19 and is connected to certain of the components of the apparatus, as will be hereinafter explained. A terminal block 48 also is mounted on wall 14.

Referring to FIG. 9 which illustrates the electrical circuit diagram, it will be seen that the primary coil 47a of the transformer 47, the synchronous motor 27, and a pilot light 50 mounted on wall 10a are connected in parallel across conductors 51 and 52. Conductor 51 is connected to one side of a 115 volt power line. It will be understood that the apparatus may be powered by batteries. Connector 52 is connected to one terminal of the switch 41, the other terminal of said switch being connected to the other side of the power line. A pushbutton switch 53 mounted on the forward wall 10a of the housing is connected in shunt relationship to switch 41. The ignition element 42 is connected to one terminal of the secondary coil 47b of the transformer and to one terminal of switch 39. The other terminal of said switch is connected to the other terminal of the secondary coil 47b.

Assuming that the magazine 17 has been filled with a supply of cigarettes C and that the wall member 25 has been adjusted for proper positioning of the ends of the cigarettes in relation to the ignition element, to initiate operation of the apparatus, the push button switch 53 is depressed, thereby completing a circuit through the motor 27 and also through the pilot light 50 and the primary coil 47a of the transformer. It is noted that the member 23 always comes to reset in a position where a flute 24 is disposed in registration with the ignition element 42 and with the flute immediately following uppermost, as seen clearly in FIG. 3. If the apparatus has been previously used there will be a cigarette contained in the flute which is in registration with the ignition element 42. It is also noted that the axis of the flute in registration with the ignition element is at a higher elevation than the axis of shaft 26. This serves to retain the cigarette in the flute and prevents the cigarette from falling out of the flute during ignition.

The motor 27, when energized, through sprocket wheels 34 and 32 and chain 33 will drive cams 28 and 29 in a clockwise direction, as viewed in FIG. 1, and in a counterclockwise direction, as viewed in FIG. 4, so that the follower arm 41a is caused to ride on the high part of cam 28, thereby effecting a closing of switch 41 which maintains the circuit to the motor 27, pilot light 50, and primary coil 47a closed to energize the same during one complete revolution of cam 28. Cam 29, starting from its at rest position illustrated in FIG. 6, is also caused to rotate simultaneously with cam 28, and the follower arm 39a immediately is caused to ride on the high portion of the cam 29 to close switch 39, thereby effecting energization of the ignition element 42. Said ignition element will remain energized during the interval in which the follower 39a rides on the high portion of the cam 29 in a single revolution of the same. This interval, of course, is adequate to effect ignition of a cigarette.

As seen in FIG. 6, during the last quarter turn of the cams 28 and 29, the pin 38 engages in one of the slots 37 of the member 36 and effects rotation of said member substantially 90° in a clockwise direction. This effects rotation of shaft 26 which in turn rotates the member 23 through 90° and moves a fresh cigarette which is contained in the uppermost flute into a position of registration with the ignition element 42. Substantially at that point the low point of cam 28 is engaged by the follower arm 41a, thereby effecting opening of switch 41 and the deenergization of motor 27, as well as pilot light 50 and primary coil 47a. Also, a short interval before such deenergization, the follower of switch arm 39a has reached the low point of the cam 29, effecting opening of switch 52 and deenergization of the ignition element 42 so as to avoid ignition of a succeeding cigarette moving into igniting position. As the member 23 is caused to rotate 90° to move a fresh cigarette in position to be ignited, the cigarette which is already ignited is caused to be discharged from its flute to drop on to ledge 44 where it is available to be picked up by a smoker.

Figure 7:
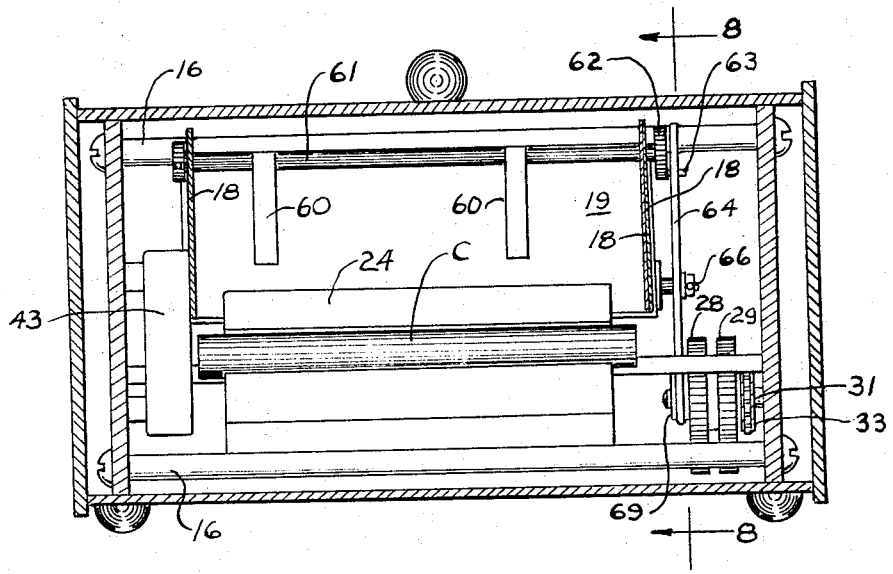
FIG. 7 is a view similar to FIG. 5 but showing a modified embodiment of my invention.

In the modified embodiment illustrated in FIGS. 7 and 8, the apparatus includes all of the structural features hereinabove described in addition to means for assuring alinement and deposition of cigarettes in the flutes 24. Said means includes a pair of fingers 60 fixed on a shaft 61 journalled in wall members 18. A disk 62 is fixed on one end of shaft 61 and is provided with a laterally projecting pin 63. A lever 64 is pivotally supported as at 66, the upper end of said arm having a slot 67 adapted to receive pin 63. A coil spring 68 biases the lever 64 in a counterclockwise direction. The lower portion of lever 64 is adapted to engage against a cam 69 fixed on shaft 31. As shaft 31 is caused to be rotated, as hereinbefore explained, lever 64 is caused to be rocked to effect oscillation of shaft 61 and correspondingly fingers 60. Said fingers engage the cigarettes in the magazine and serve to arrange the cigarettes so that they are disposed in proper parallel alinement with the flutes 24 to insure that a cigarette will drop into a registering flute in the rotation of member 23.

It will be apparent from the foregoing that I have provided a novel apparatus which is fully automatic to position a cigarette for ignition and to deliver an ignited cigarette for immediate use.

It will be understood that various changes and modifications may be made from the foregoing without departing from the spirit and scope of the appended claims.

What is claimed is:

1. An apparatus for igniting and dispensing cigarettes comprising, a magazine adapted to contain a plurality of cigarettes and having an opening in the bottom thereof through which the cigarettes may pass, a rotatable member having a plurality of longitudinally extending flutes and disposed below said opening whereby said flutes are caused to pass successively into registration with said opening and each to receive a cigarette in the course of rotation of said rotatable member, an electrical ignition element disposed in close proximity to one end of said rotatable member, a discharge chute having its upper edge in close proximity to said rotatable member and to said ignition element, a motor having speed reducing means associated therewith, a Geneva movement driven by said motor for intermittently rotating said rotatable member a fraction of a revolution in each cycle of operation whereby in one cycle of operation a cigarette is carried by said rotatable member from said magazine to a position wherein one end of said cigarette is disposed in close proximity to said ignition element and in the next cycle of operation said cigarette is ignited immediately prior to discharge from said apparatus.

2. The invention as defined in claim 1 in which the ignition element is energized by the secondary coil of the transformer.

3. The invention as defined in claim 1 in which the magazine is provided with a movable member for locating different sizes of cigarettes in proper relation to said ignition element.

4. The invention as defined in claim 1 including oscillatable means for alining cigarettes in said magazine so as to be in registration with said flutes as said rotatable member is rotated.

5. The invention as defined in claim 4 in which the oscillatable means includes a pair of oscillatable fingers adapted to engage the cigarettes in the magazine and aline said cigarettes with said flutes.

6. An apparatus for igniting and dispensing cigarettes comprising, a magazine adapted to contain a plurality of cigarettes and having an opening in the bottom thereof through which the cigarettes may pass, a rotatable member having a plurality of longitudinally extending flutes and disposed below said opening whereby said flutes are caused to pass successively into registration with said opening and each to receive a cigarette in the course of rotation of said rotatable member, an electrical ignition element disposed in close proximity to one end of said rotatable member, a motor having speed reducing means associated therewith, a Geneva movement driven by said motor for intermittently rotating said rotatable member a fraction of a revolution in each cycle of operation, a first switch in electrical connection with said motor, a first cam operative to actuate said first switch to maintain said motor in operation for one complete rotational cycle of said cam, a second switch in electrical connection with said ignition element, a second cam operative to actuate said second switch, said first and second cams being fixed together and simultaneously rotatable, a manually operated switch in electrical connection with said motor for initiating operation of the same and energization of said ignition element whereby sequentially in one cycle of operation a cigarette is carried by said rotatable member from said magazine into registration with said ignition element and in the next cycle of operation said cigarette is ignited and then discharged from said apparatus in ignited condition.

7. An apparatus for igniting and dispensing cigarettes comprising, a magazine adapted to contain a plurality of cigarettes and having an opening in the bottom thereof through which the cigarettes may pass, a rotatable member having a plurality of longitudinally extending flutes and disposed below said opening whereby said flutes are caused to pass successively into registration with said opening and each to receive a cigarette in the course of rotation of said rotatable member, an electrical ignition element disposed in close proximity to one end of said rotatable member, drive means including an intermittently operating motor, means operatively connecting said drive means to said rotatable member during a portion of the rotational cycle of said rotatable member, means for automatically arresting rotation of said rotatable member upon the completion of a rotational cycle, a first switch in electrical connection with said motor, a first cam operative to actuate said first switch to maintain said motor in operation for one complete rotational cycle of said cam, a second switch in electrical connection with said ignition element, a second cam operative to actuate said second switch, said first and second cams being fixed together and simultaneously rotatable, and manually operated means for initiating operation of said motor and energization of said ignition element whereby sequentially in one cycle of operation a cigarette is carried by said rotatable member from said magazine into registration with said ignition element and in the next cycle of operation said cigarette is ignited and then discharged from said apparatus in ignited condition.

References Cited by the Examiner

UNITED STATES PATENTS

| | | | |
|---|---|---|---|
| 2,038,787 | 1/1936 | Lane | 221—147 |
| 2,108,376 | 2/1938 | Copeland | 221—147 |
| 2,232,125 | 2/1941 | McChristian | 221—145 |
| 2,419,458 | 4/1947 | Mayer | 221—200 |
| 2,540,856 | 2/1951 | Andrews et al. | 221—113 X |
| 2,643,930 | 6/1953 | Nissly | 221—147 |
| 2,779,501 | 1/1957 | Alfrey | 221—2 |
| 2,889,959 | 6/1959 | Landgraf | 221—200 X |
| 2,890,781 | 6/1959 | Gore | 221—123 X |

ROBERT B. REEVES, *Primary Examiner.*

WALTER SOBIN, *Examiner.*